Dec. 17, 1935.  R. D. WELLS  2,024,674
CHECK DAMPER
Filed May 20, 1933
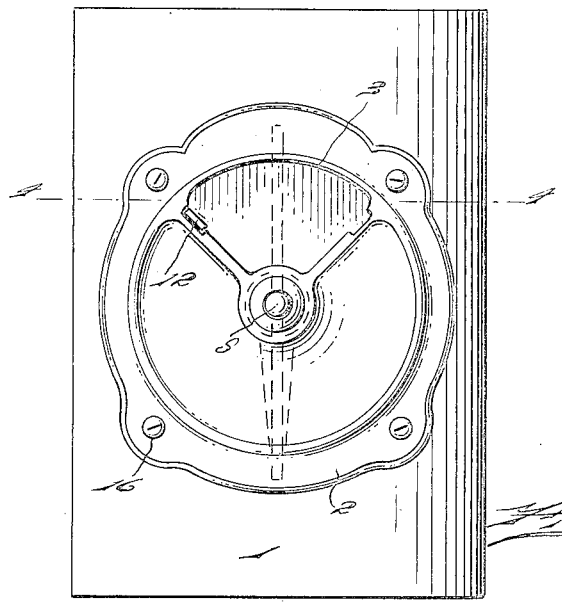
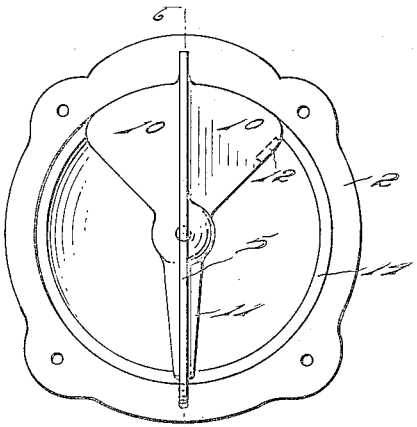
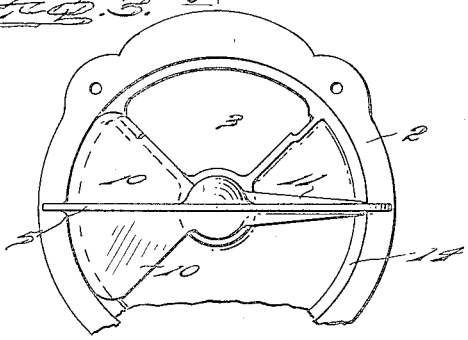
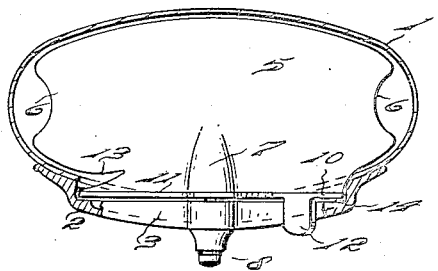
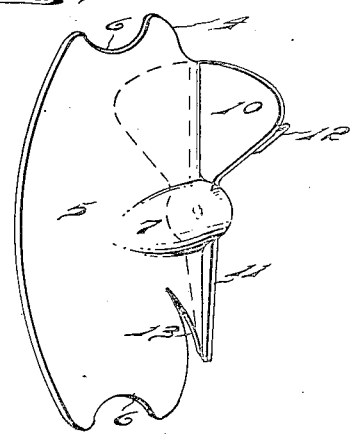
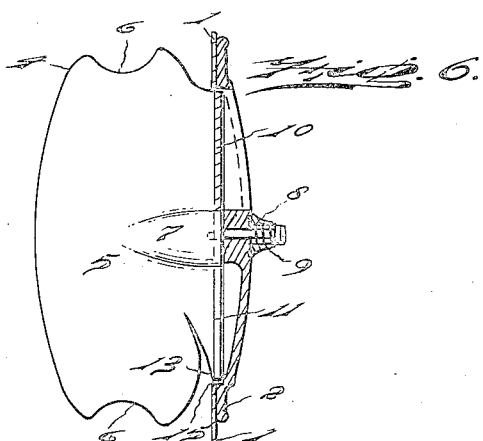
INVENTOR
Russell D. Wells
BY
Herbert S. Fairbanks
ATTORNEY Patented Dec. 17, 1935

2,024,674

UNITED STATES PATENT OFFICE 2,024,674

CHECK DAMPER

Russell D. Wells, Pottstown, Pa.

Application May 20, 1933, Serial No. 671,946

1 Claim. (Cl. 126—293)

The object of this invention is to devise a novel construction of a check damper which can be assembled as a unit of structure with an exit pipe for the products of combustion.

A further object of the invention is to devise a novel check damper having a novel mounting provided with an opening and a novel damper rotatably carried by said mounting and provided with a valve member controlling the introduction of air into the exit pipe.

With the above and other objects in view, as will hereinafter more clearly appear, my invention comprehends a novel check damper.

It further comprehends a novel check damper which as a unit of structure with its mounting can be readily assembled with respect to an exit flue.

It further comprehends a novel construction of a damper having a valve member to control the check opening and having a slot whereby it can be inserted into position in the exit pipe through an opening of minimum size.

Other novel features of construction and advantage will hereinafter more clearly appear in the detailed description and the appended claim.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a front elevation of a check damper embodying my invention, assembled with respect to an exit pipe.

Figure 2 is a rear elevation of the check damper and its mounting.

Figure 3 is a rear elevation of the check damper and its mounting, the check damper being shown in its open position.

Figure 4 is a section on line 4—4 of Figure 1.

Figure 5 is a perspective view of the damper in detached position.

Figure 6 is a section on line 6—6 of Figure 2.

Similar numerals of reference indicate corresponding parts.

Referring to the drawing:—

1 designates an exit pipe forming the exit flue from a stove, range, heater, or similar device, in order to convey the products of combustion to the chimney. The exit pipe is provided with a draft opening 15 which is closed by means of a mounting 2 the rear face of which preferably conforms to the contour of the pipe and this mounting is secured in the pipe by means of fastening devices 16, such as, for example, bolts and nuts. The mounting 2 is in the form of a casing having a check opening 3 to admit atmospheric air to the exit pipe and form a check for the fire.

4 designates a damper preferably made from a casting and comprising a plate 5 conforming to the inner contour of the pipe and having at opposite sides the cut out portion 6 so that when the damper is in closed position in the pipe 1 a certain proportion of the gases can pass through the pipe. The plate 5 is provided with an outwardly deflected portion 7 which provides a clearance for effecting the swaging of the pivot pin 8 in position. This pivot pin telescopes into a bushing 9 and is headed at its outer end while its inner end passes through the damper and is swaged over. It will thus be seen that the damper is rotatably carried by its mounting. The damper is provided with a valve portion in the form of a segment 10 which extends on opposite sides of the damper. The opposite side of the hub from the segment 10 is provided with a tapered plate portion 11. The plate 10 has extending outwardly from it a finger piece 12 by means of which the plate can be partially rotated. The opposite side walls of the check opening 3 form stops to limit the movement of the finger piece 12 and thereby of the damper and valve. The damper is provided at one side with a slot 13 which facilitates the insertion of the damper into the pipe. The inner face of the mounting is channeled out to form an annular shoulder 14 on which the damper rides, and a spring 17 tends to retain the damper against such shoulder. The inner face of the plate is deflected to conform to the contour of the exit pipe so that it will closely engage such exit pipe.

The manner of assembling the check damper with the pipe and the manner in which the check damper is actuated will now be apparent to those skilled in this art and is as follows.

Assuming that the valve 10 is in its closed position with the damper substantially vertical, the damper is inserted through the opening 15 cut out in a pipe, see Figure 6, and moved downwardly. This action is permitted due to the provision of the slot 13, it being seen from Figure 6 that the damper is longer than the diameter of the opening 15. The mounting is then moved upwardly and secured to the pipe by means of the fastening devices 16. The damper and its mounting are now assembled with respect to the pipe ready for operation.

When the parts are in the position seen in Figure 1 the check opening 3 is closed by the valve 10 and the damper 5 is in its vertical position as shown in dotted lines in Figure 1. Assuming now that it is desired to check the operation of the fire, the operator presses against the finger piece 12 thereby moving the valve 10 towards the right and uncovering the check opening 3 to the desired degree. When the damper is moved to its closed position the check opening 3 is fully opened so that atmospheric air can pass through the check opening 3 and form a check. This position is shown in Figure 4. The damper 5 is preferably cut away so that it does not entirely close the exit opening but permits sufficient space for gases to pass between the damper and the exit pipe.

In accordance with my present invention it is not necessary to form an opening in the pipe for the pivot member or members of the damper and the mounting can be assembled as a unit of structure with the exit or smoke pipe.

Having thus described my invention what I claim as new and desire to secure by Letters Patent, is:

The combination with a stove pipe having an opening in its side wall, of a mounting covering said opening and provided with a check opening, a damper rotatably mounted on said mounting and having a check plate to cover and uncover the check opening and a damper portion for the pipe integral with the check plate, the damper portion being of greater diameter than the stove pipe opening and having a slot extending upwardly from its bottom to enable the damper when assembled as a unit with its mounting to be passed through the stove pipe opening, and resilient means to retain said damper in the position to which it has been adjusted on said mounting.

RUSSELL D. WELLS.